(12) United States Patent
Habermann et al.

(10) Patent No.: US 9,069,800 B2
(45) Date of Patent: *Jun. 30, 2015

(54) PARALLEL DATABASE BACKUP AND RESTORE

(71) Applicant: Microsoft Corporation, Redmond, WA (US)

(72) Inventors: Jeffrey Ronald Habermann, Yorba Linda, CA (US); Paul Herman Dyke, Mission Viejo, CA (US); Anthony C. Liberto, San Clemente, CA (US); Bryan C. Arntson, Aliso Viejo, CA (US); Jaynika Chirag Barot, Tustin, CA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/918,270

(22) Filed: Jun. 14, 2013

(65) Prior Publication Data

US 2013/0282661 A1      Oct. 24, 2013

Related U.S. Application Data

(63) Continuation of application No. 13/040,119, filed on Mar. 3, 2011, now Pat. No. 8,478,726.

(51) Int. Cl.
  *G06F 17/30*   (2006.01)
  *G06F 7/06*    (2006.01)
  *G06F 11/14*   (2006.01)

(52) U.S. Cl.
  CPC .... *G06F 17/30289* (2013.01); *G06F 17/30575* (2013.01); *G06F 11/1448* (2013.01);

(Continued)

(58) Field of Classification Search
  CPC .......... G06F 11/1464; G06F 17/30575; G06F 11/1469; G06F 11/1448; G06F 17/30224
  USPC ............... 707/999.2, 999.204, 640–643, 649, 707/674, 679–681
  See application file for complete search history.

(56) References Cited

U.S. PATENT DOCUMENTS 6,154,852 A * 11/2000 Amundson et al. .......... 714/5.11
6,505,216 B1 * 1/2003 Schutzman et al. ................. 1/1

(Continued)

OTHER PUBLICATIONS

Vertica, The Vertica Analytic Database Technical Overview While Paper, A DBMS Architecture Optimized for Next-Generation Data Warehousing, Nov. 2008, (13 pages).

(Continued)

*Primary Examiner* — Bruce Moser
(74) *Attorney, Agent, or Firm* — Brian Haslam; Dolan Stein; Micky Minas

(57) ABSTRACT

Embodiments are directed to simultaneously backing up data from multiple locations to a single location and to restoring data from a single location to multiple locations simultaneously. In an embodiment, a computer system receives a backup command from a user which indicates that various specified portions of data are to be backed up. The data portions are stored in multiple different locations in a parallel database. The computer system generates multiple backup commands specific for each location in which the data is stored. The backup commands initiate a parallel backup from the various locations to a single location in a data store. The computer system also executes the generated backup commands in parallel, so that the data from each of the different locations is backed up in the data store.

25 Claims, 4 Drawing Sheets

(52) U.S. Cl.
CPC .... *G06F17/30224* (2013.01); *G06F 17/30283*
(2013.01); *G06F 11/1464* (2013.01); *G06F*
*11/1469* (2013.01); *G06F 2201/80* (2013.01);
*G06F 2201/82* (2013.01)

(56) References Cited

U.S. PATENT DOCUMENTS

| | | | |
|---|---|---|---|
| 7,003,560 | B1 | 2/2006 | Mullen et al. |
| 7,685,459 | B1 | 3/2010 | De Spiegeleer et al. |
| 7,702,867 | B2 | 4/2010 | Coombs et al. |
| 8,015,375 | B1* | 9/2011 | Gulve et al. ............ 711/162 |
| 8,131,964 | B2 | 3/2012 | Retnamma et al. |
| 2004/0220981 | A1* | 11/2004 | Taylor ............ 707/204 |
| 2005/0038836 | A1 | 2/2005 | Wang |
| 2005/0172093 | A1* | 8/2005 | Jain ............ 711/162 |
| 2006/0179085 | A1* | 8/2006 | Kaijima et al. ............ 707/204 |
| 2007/0214196 | A1* | 9/2007 | Garimella et al. ............ 707/204 |
| 2009/0013013 | A1* | 1/2009 | Derk et al. ............ 707/204 |
| 2010/0106691 | A1 | 4/2010 | Preslan et al. |
| 2010/0211549 | A1* | 8/2010 | Shetty et al. ............ 707/665 |
| 2013/0262389 | A1* | 10/2013 | Rathof et al. ............ 707/642 |

OTHER PUBLICATIONS

Optimizing Backup and Restore Performance in SQL Server, http://msdn.microsoft.com/en-us/library/ms190954 (printer).aspx, Dec. 14, 2010 (Retreieved Date), (5 pages).

John H. Miller et al., Microsoft SQL Server 2000 RDBMS Performance Turing Guide for Data Warehousing, Aug. 21, 2001, (55 pages).

Lou Agosta, Very Large Data Warehouses Challenge Backup, Jun. 2005, (2 pages).

Office Action cited in U.S. Appl. No. 13/040,119, mailed Nov. 7, 2012.

Notice of Allowance cited in U.S. Appl. No. 13/040,119, mailed Apr. 8, 2013.

\* cited by examiner

PARALLEL DATABASE BACKUP AND RESTORE

CROSS-REFERENCE TO RELATED APPLICATIONS

This application is a continuation of U.S. patent application Ser. No. 13/040,119, filed Mar. 3, 2011, and entitled "Parallel Database Backup and Restore." The contents of the foregoing application are incorporated by reference herein in their entirety.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed to interact with other software applications or other computer systems. For example, a software application may be designed to interact with a database or other back-end data store. A client using the software application may indicate that data is to be backed up on the data store. Such backups may include very large amounts of data and, as a result, may take a long time to complete.

BRIEF SUMMARY

Embodiments described herein are directed to simultaneously backing up data from multiple locations to a single location and to restoring data from a single location to multiple locations simultaneously. In one embodiment, a computer system receives a backup command from a user which indicates that various specified portions of data are to be backed up. The data portions are stored in multiple different locations in a parallel database. The computer system generates multiple backup commands specific for each location in which the data is stored. The backup commands initiate a parallel backup from the various locations to a single location in a data store. The computer system also executes the generated backup commands in parallel, so that the data from each of the different locations is backed up in the data store.

In another embodiment, a computer system receives a restore command from a user. The restore command indicates that various specified portions of data are to be restored from an existing backup which is stored in a data store. The computer system generates restore commands specific for each location in which the data is stored. The restore commands initiate a parallel restore from the backup in the data store to multiple locations in the parallel database. The computer system then executes the generated restore commands in parallel, so that the data from the backup in the data store is restored in parallel to each of the various different locations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
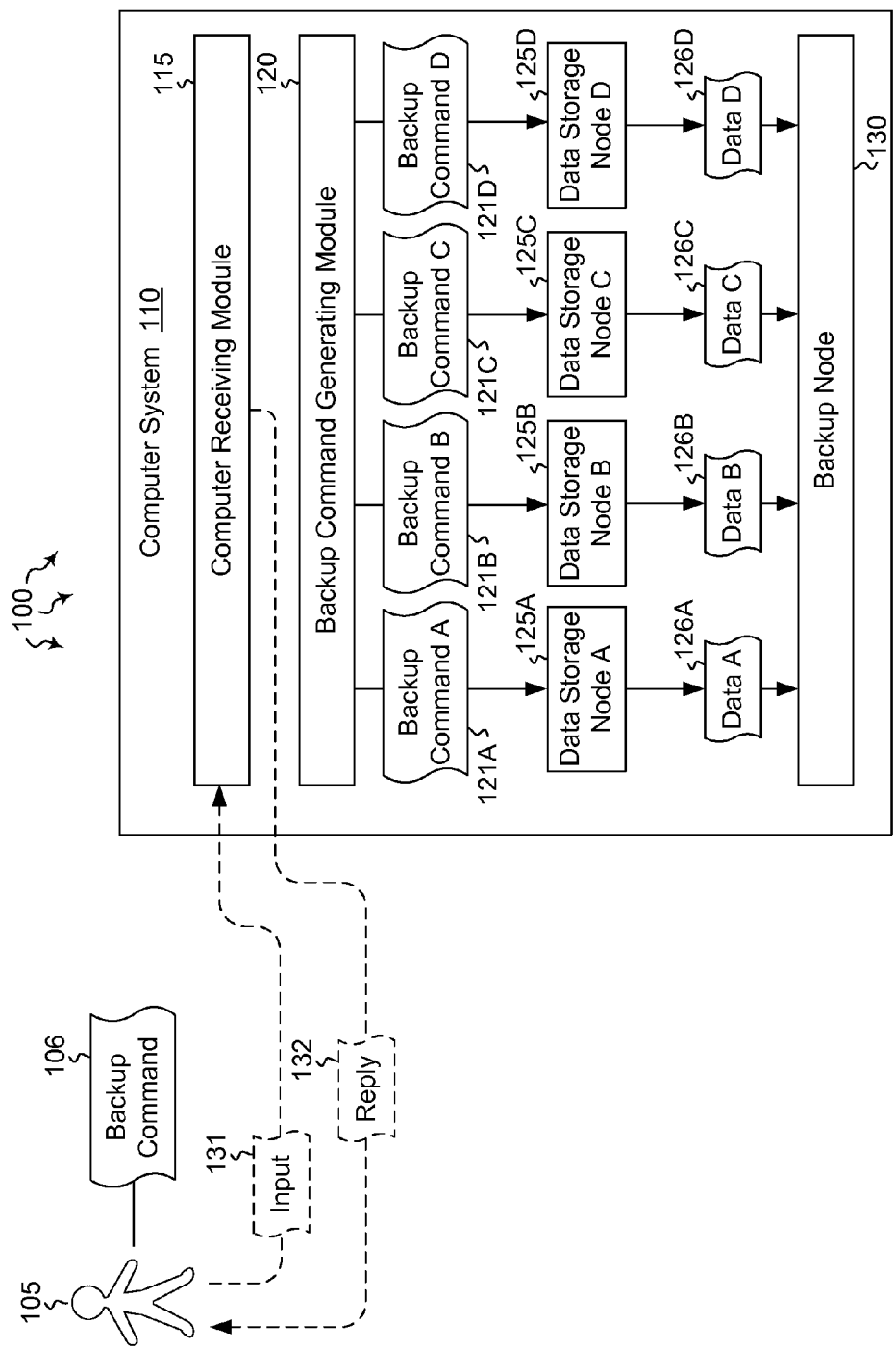
FIG. 1 illustrates a computer architecture in which embodiments of the present invention may operate including simultaneously backing up data from multiple locations to a single location.

Embodiments described herein are directed to simultaneously backing up data from multiple locations to a single location and to restoring data from a single location to multiple locations simultaneously. In one embodiment, a computer system receives a backup command from a user which indicates that various specified portions of data are to be backed up. The data portions are stored in multiple different locations in a parallel database. The computer system generates multiple backup commands specific for each location in which the data is stored. The backup commands initiate a parallel backup from the various locations to a single location in a data store. The computer system also executes the generated backup commands in parallel, so that the data from each of the different locations is backed up in the data store.

In another embodiment, a computer system receives a restore command from a user. The restore command indicates that various specified portions of data are to be restored from an existing backup which is stored in a data store. The computer system generates restore commands specific for each location in which the data is stored. The restore commands initiate a parallel restore from the backup in the data store to multiple locations in the parallel database. The computer system then executes the generated restore commands in parallel, so that the data from the backup in the data store is restored in parallel to each of the various different locations.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 110. Computer system 110 may be any type of local, distributed, fixed or mobile computing system. The computer system may include various different modules and nodes configured to perform different functions. For instance, the computer system may include a command receiving module 115 that is configured to receive commands from a user 105. The user may, for example, send backup command 106 or provide other input 131. The command receiving module may receive and interpret these commands. The interpreted commands may then be sent to the backup command generating module 120.

The backup command generating module 120 may be configured to generate multiple commands from a single command. In some embodiments, computer system 110 may comprise a parallel database. The term "parallel database", as used herein, may refer to a database that is configured to read and write large groups of data in parallel. Multiple read (or restore) commands can be issued together and carried out simultaneously. Similarly, write commands can be issued together and executed simultaneously in the parallel database. The data is stored on multiple different data storage nodes (e.g. 125A-D).

Thus, the backup command generating module may take the user's backup command 106 and generate multiple backup commands based thereon (e.g. backup commands 121A-D). Although four backup commands are shown in FIG. 1, it will be understood that substantially any number of backup commands may be generated by module 120. In some cases, module 120 generates as many backup commands as there are data storage nodes (e.g. 125A-D).

Figure 4:
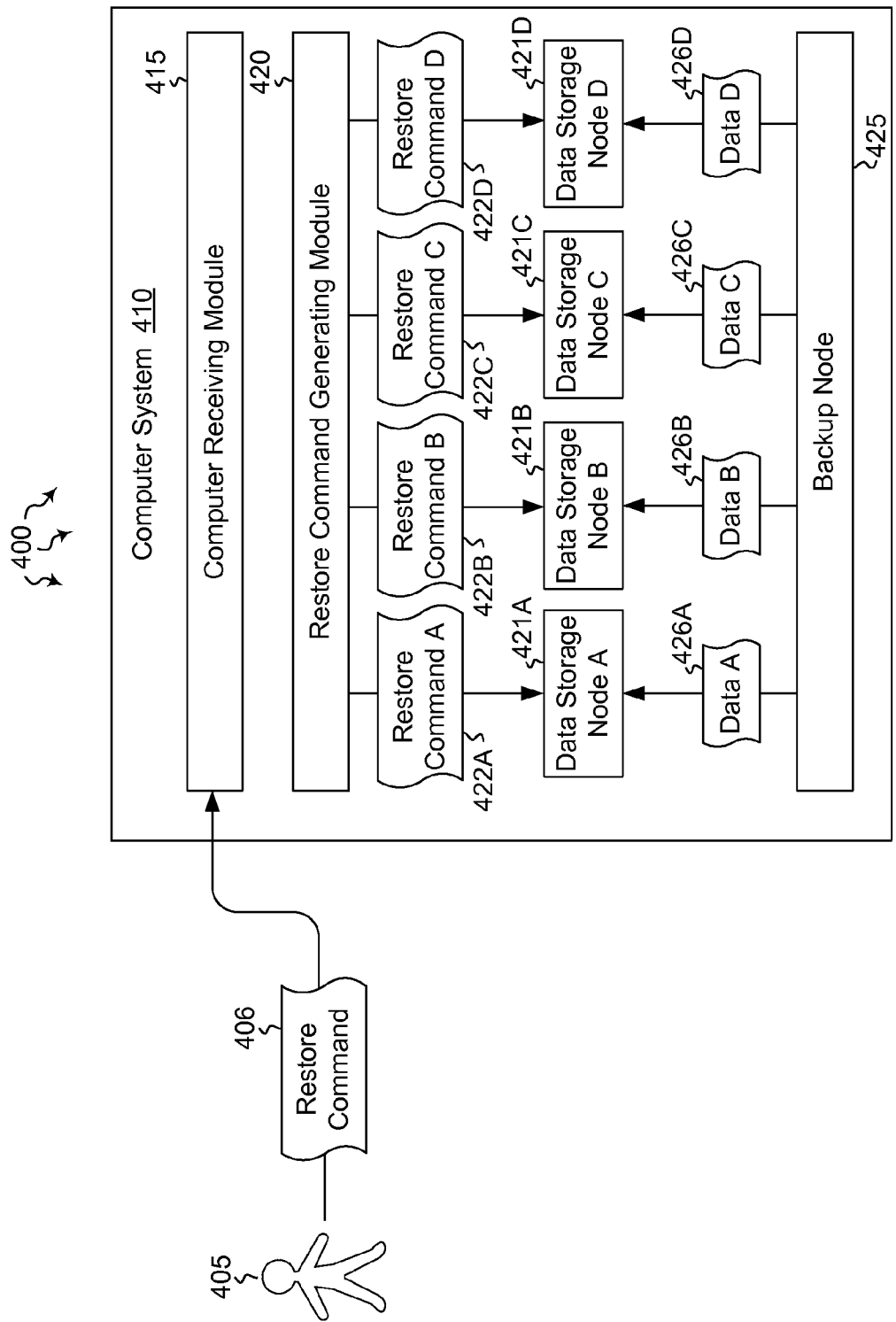
FIG. 4 illustrates an embodiment of the present invention in which data is restored from a single location to multiple locations simultaneously.

After generation, the generated backup commands 121A-D may be sent to corresponding data storage nodes. Thus, as shown in FIG. 1, backup command A (121A) may be sent to data storage node 125A, backup command B (121B) may be sent to data storage node 125B, backup command C (121C) may be sent to data storage node 125C and backup command D (121D) may be sent to data storage node 125D. In response to the received backup commands, each data storage node may send the data that is to be backed up (e.g. data 126A-D) to backup node 130. The data may be backed up on backup node 130 in a single location. The backup may be transferable to other people or other storage locations. The backup node may indicate to the receiving module the status of the backup. The receiving module may then send a reply message 132 to the user 105 indicating that the backup was successful (or, if the backup failed, a failure indication explaining the cause of the failure). As will be shown in reference to FIG. 4, data can be restored in parallel from the stored backup.

Backing up a database may include three types of data: database data, metadata, and backup information. The database data is the actual users' data. The metadata is the information used by the parallel database to link all of the underlying database server objects together to make them parallel database objects. The backup information is the data created by the backup process which is used to catalog information about the backup so it may be used for a data restore. The backup information identifies where each portion of data was stored prior to the backup (i.e. on which data storage nodes 125A-D the data was stored). Once a database is backed up, a user may move or copy the data backup to any location (e.g. to a tape drive, to a different computer, to an external hard drive, or other data store).

In some cases, a folder is created on the backup node 130. The backed up data is stored on the backup node. The folder holds and maintains the backed up information. The name of the folder may be the name of the backup, and all information related to the backup, including the database data, metadata and backup information, is placed inside the folder. In some embodiments, backup commands may be encased inside a parallel database query plan. Since the commands are inside a parallel database query plan, a parallel database query engine may execute this plan like any other plan. This allows the commands to be executed in parallel across the computer system's compute nodes.

Prior to issuing the parallel backup commands 121A-D, backup files may be pre-allocated on the destination computer system with the same names that the individual nodes back up to. This pre-allocation may increase data input and output within the computer system. In some cases, when the backup command generating module is generating the backup commands, one or more performance options may be added. The options may include an option to increase the parallelism, increase or decrease compression, etc.

Backing up the parallel database metadata information may be accomplished by using a two-step process. The first step may involve instantiating a temporary database and copying the necessary information from a parallel database-specific metadata (including catalog or privileges information) into this temporary database. The second step may include backing up the data to the temporary database, and from the temporary database to the backup node. Once the backup is complete, the temporary database is discarded.

Restoring a database may similarly involve database data, metadata and backup information. The data is the actual backup files that were generated and stored on the backup node. The metadata information is used by the parallel database engine to link all the underlying parallel database server objects together to make them parallel database objects. The backup information was created by the backup process and is used by the restore process to generate a restore plan. In some embodiment, the restore may include the following steps: use the backup information to generate a restore plan, use the parallel database's restore feature to restore the data to the appropriate data storage nodes (125A-D), restore the metadata information, and extend the database if necessary.

In some cases, the restore commands may be encased inside a parallel database query plan. Since the restore commands are inside a plan, the parallel database engine's distributor may execute this plan like it would other plans. This allows the commands to be executed in parallel across the compute nodes. As with the backup commands, when building the restore commands, performance options may be available (e.g. increase parallelism, increase/decrease compression, etc.).

Figure 2:
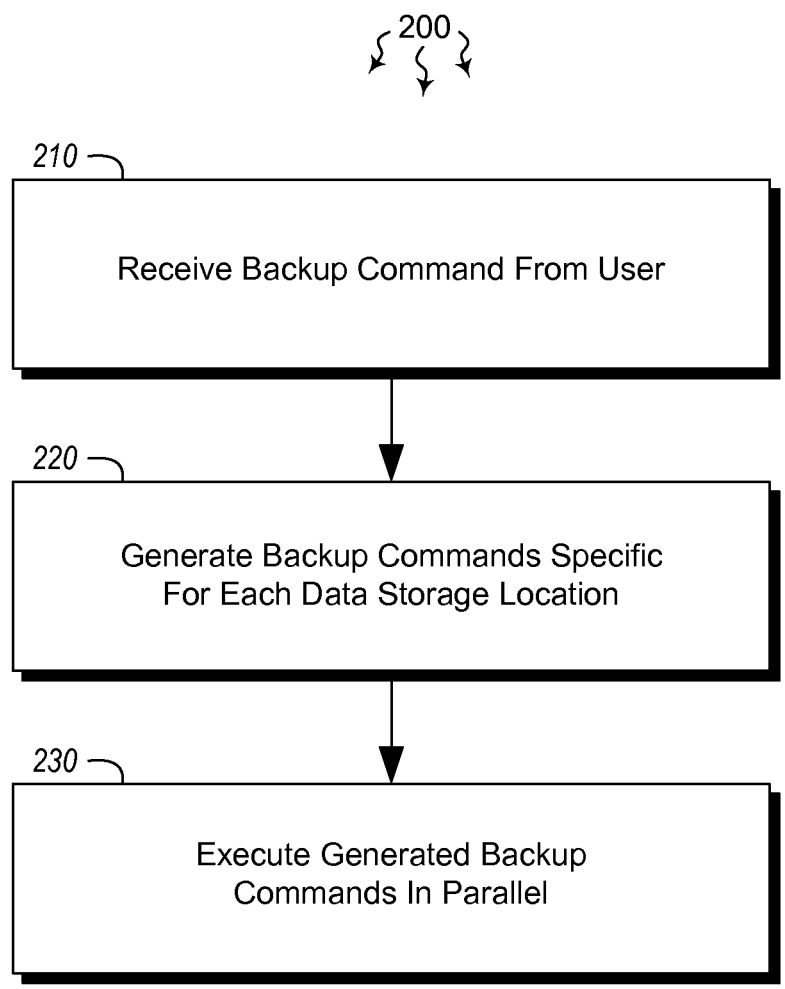
FIG. 2 illustrates a flowchart of an example method for simultaneously backing up data from multiple locations to a single location.
Figure 3:
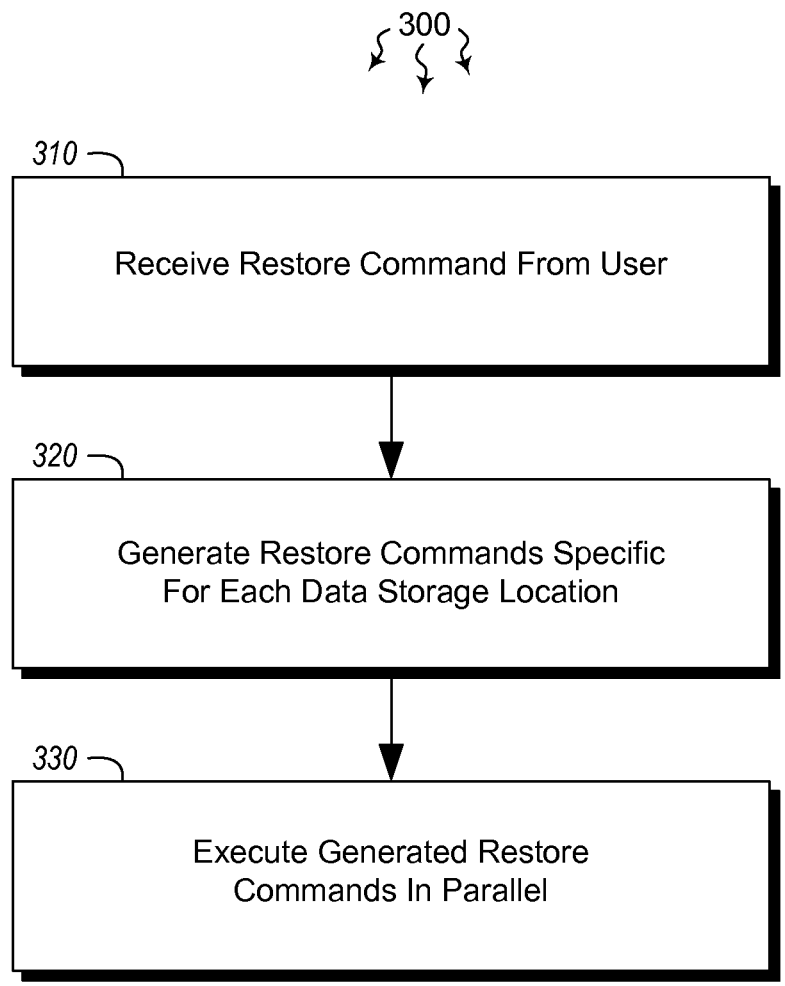
FIG. 3 illustrates a flowchart of an example method for restoring data from a single location to multiple locations simultaneously.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for simultaneously backing up data from a plurality of locations to a single location. The method 200 will now be described with frequent reference to the components and data of environment 100.

Method 200 includes an act of receiving a backup command from a user, the backup command indicating that one or more specified portions of data are to be backed up, wherein the data portions are stored in a plurality of different locations in a parallel database (act 210). For example, command receiving module 115 may receive backup command 106 from user 105 indicating that various user-specified portions of data are to be backed up. The data may be any type of data that is digitally storable. The data portions may comprise data related to a certain application, data from within a certain time period, data pertaining to the user or other data. The data is stored on one or more data storage nodes (e.g. 125A-D) in the parallel database (e.g. computer system 110).

The backup command may be parsed and authenticated prior to generating the plurality of backup commands. The parsing may identify certain portions or specific commands within the backup command. The data backup commands may be received at a dedicated node that receives and stores the backup data (e.g. command receiving module 115). The user may be able to send the backup command to the command receiving module and, with a single command, cause the backup to begin backing up the indicated data to the backup node.

Method 200 includes an act of generating a plurality of backup commands specific for each location in which the data is stored, the backup commands initiating a parallel backup from the plurality of locations to a single location in a data store (act 220). For example, backup command generating module 120 may generate backup commands 121A-D which are specific for each location in which the data is stored (e.g. data storage nodes 125A-D, respectively). The backup commands may be configured to initiate a parallel backup from the data storage nodes to backup node 130. Each of the generated backup commands may comprise a specialized command that is syntactically different than the other backup commands. Thus, for example, backup command 121A that is generated for data storage node 125A may be syntactically different than backup command 121B that is generated for data storage node 125B (and so on for backup commands 121C, 121D and any other backup commands). As mentioned above, in some cases, one or more portions of data that are to be backed up to one or more specified backup locations may be pre-allocated, before receiving the request to back up the data.

Method 200 includes an act of executing the generated backup commands in parallel, such that the data from each of the plurality of different locations is backed up in the data store (act 230). For example, computer system 110 may execute the generated backup commands 121A-D in parallel. In this manner, each portion of data 126A-D is sent to the backup node at the same time. The data is received by and written to the backup node 130 where it is stored for later access. Portions of corresponding metadata may be sent along with the backup data. At least in some cases, the metadata may indicate where each portion of the backup data was stored (i.e. on which data storage node the data was stored). In some cases, the data files of the data backup may be viewed by a user in a single folder on the backup node. The files may appear to be in the same folder, regardless of where the data files are actually stored.

In some embodiments, the computer system may be an integrated computing system or appliance computing system that includes processing resources, storage resources and networking resources. The appliance computing system may be pre-loaded with parallel database software, such that the parallel database processing and storage occurs on the appliance, where each of the appliance components communicate via a high speed internal network. In such an embodiment, the backup command 106 may be received and processed at the appliance computing system. The appliance computing system may include hardware and installed software for the interfacing with the appliance, and with its individual components. Using this interface, the user 105 may be able to access the stored backup and move the backup to a different location if desired.

It will be understood that the data backups may be full backups or differential backups. Full backups may be configured to back up all the information indicated by the user. Differential backups may be performed when a backup of the user-specified data has already been performed. The differential backup may be configured to back up only the changes in the files since the last time the data was backed up. Regardless of which backup type is performed, the backup may provide data consistency across the data store nodes by creating a point-in-time image of the data for which the backup command was received. This image may be stored, archived, moved or otherwise transferred to another data storage location.

Turning now to FIG. 3, FIG. 3 illustrates a flowchart of a method 300 for restoring data from a single location to a plurality of locations simultaneously. The method 300 will now be described with frequent reference to the components and data of environment 400 of FIG. 4.

Method 300 includes an act of receiving a restore command from a user, the restore command indicating that one or more specified portions of data are to be restored from an existing backup, wherein the data backup is stored in a data store (act 310). For example, command receiving module 415 of computer system 410 may receive restore command 406 from user 405. The restore command may specify various portions of data that are to be restored from an existing backup, stored on backup node 425. In some cases, the user may be able to specify that all of the user's data is to be restored from a backup with a single command.

Method 300 includes an act of generating a plurality of restore commands specific for each location in which the data is stored, the restore commands initiating a parallel restore from the backup in the data store to a plurality of locations in the parallel database (act 320). For example, restore command generating module 420 may generate restore commands 422A-D which are specific to data storage nodes 421A-D, respectively. The restore commands may be configured to initiate a parallel restore from the stored backup to the data storage nodes. The data storage nodes may read the data from the backup in parallel. In some cases, metadata corresponding to the backup data may be accessed to determine which data storage node each portion of data is to be sent to. The metadata may also be used to indicate other associated information such as the owner of the data, the date and time the data was backed up, and other information.

Method 300 includes an act of executing the generated restore commands in parallel, such that the data from the backup in the data store is restored in parallel to each of the plurality of different locations (act 330). For example, computer system 410 (which, at least in some embodiments, comprises a parallel database) may execute generated restore commands 422A-D in parallel. In this manner, the data 426A-D from the backup node is restored to the corresponding data storage nodes 421A-D in parallel. In some cases, the data may be restored from a smaller number of nodes (e.g. on a smaller appliance) to a larger number of data storage nodes (e.g. on a larger appliance). The data may be automatically redistributed among the larger number of nodes. The restored backup may provide data consistency across the data store nodes by restoring a point-in-time image of the data for which the restore command was received. Thus, a user may opt to restore selected portions of data, or restore an entire point-in-time image of the user's data.

Accordingly, methods, systems and computer program products are provided which simultaneously back up data from a plurality of locations to a single location. Moreover, methods, systems and computer program products are provided which restore data from a single location to a plurality of locations simultaneously.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer program product comprising one or more computer-readable hardware storage devices having stored thereon computer-executable instructions that, when executed by one or more processors of a computer system, cause the computer system to implement a method for simultaneously backing up data from a plurality of data storage nodes to a backup node, the method comprising:
   receiving a backup command from a user, the backup command indicating that a specified portion of data of a parallel database is to be backed up to a backup node, wherein the specified portion of data is stored across a plurality of different data storage nodes of the parallel database;
   based on receiving the backup command, generating a plurality of backup commands, including generating a different backup command for each of the plurality of data storage nodes, each different backup command being configured to instruct the corresponding data storage node to initiate a backup of a corresponding piece of the specified portion of data that is stored at the corresponding data storage node, such that the plurality of backup commands are configured to initiate a parallel backup from the plurality of data storage nodes to a single data store at the backup node; and
   initiating execution of the generated plurality of backup commands at each of the plurality of data storage nodes in a parallel manner, such that the corresponding piece of data from each of the plurality of different data storage nodes is backed up in the data store at the backup node in parallel.

2. The computer program product of claim 1, wherein the received backup command is parsed and authenticated by the computer system prior to generating the plurality of backup commands.

3. The computer program product of claim 1, wherein one or more corresponding portions of metadata stored in the data store indicate where each portion of the backup data was stored.

4. The computer program product of claim 1, wherein each of the generated backup commands comprises a specialized command that is syntactically different than the other backup commands.

5. The computer program product of claim 1, wherein the backup node pre-allocates one or more files on the data store, each file corresponding to a different one of the plurality of different data storage nodes, prior to the computer system initiating execution of the generated plurality of backup commands.

6. The computer program product of claim 1, wherein data files of the data backup are viewed by a user in a single folder on the data store, regardless of where the data files are actually stored.

7. The computer program product of claim 1, wherein the backup command is received at a dedicated backup node that receives and stores backup data.

8. The computer program product of claim 1, wherein the backup is initiated by a single backup command to a single computer system.

9. The computer program product of claim 1, wherein the backup command is received and processed at an integrated computer system, wherein the integrated computer system includes an interfacing computer system that receives user inputs and a plurality of data backup nodes, wherein the data backup nodes of the integrated computer system communicate via internal communication links.

10. The computer program product of claim 9, wherein the integrated computer system includes hardware and installed software of the interfacing computer system, the data backup nodes and the internal communication links.

11. The computer program product of claim 1, wherein the stored backup is configured to be accessed and moved to a different location by one or more users.

12. The computer program product of claim 1, wherein the backup performed comprises at least one of a full backup or a differential backup.

13. The computer program product of claim 1, wherein the backup provides data consistency across the plurality of data storage nodes by creating a point-in-time image of the specified portion of data for which the backup command was received.

14. A method, implemented at a computer system that includes one or more processors, for simultaneously restoring data from a single backup node to a plurality of data storage nodes, the method comprising the following:
an act of the computer system receiving a restore command from a user, the restore command indicating that a specified portion of data of a parallel database is to be restored from an existing data backup at a backup node, wherein the data backup is stored in a data store at the backup node;
based on receiving the restore command, an act of the computer system generating a plurality of restore commands, including generating a different restore command for each of a plurality of data storage nodes of the parallel database, each different restore command being configured to instruct the corresponding data storage node to initiate a restore of a corresponding piece of the specified portion of data that is stored at the existing data backup, such that the plurality of restore commands are configured to initiate a parallel restore from the existing data backup in the data store to each of the plurality of data storage nodes of the parallel database; and
an act of the computer system initiating execution of the generated plurality of restore commands at each of the plurality of data storage nodes in a parallel manner, such that each corresponding piece of data from the existing data backup in the data store is restored in parallel to each corresponding data storage node.

15. The method of claim 14, wherein the existing data backup includes corresponding pieces of data from a first number of data storage nodes, but the existing data backup is restored to a second number of nodes, the second number of nodes being greater in number than the first number of nodes.

16. The method of claim 15, wherein restoring the existing data backup includes redistributing the existing data backup among the second number of nodes.

17. The method of claim 14, wherein a portion of corresponding metadata stored with the existing data backup is accessed to determine which location each piece of data is to be sent to.

18. The method of claim 14, wherein the restored backup provides data consistency across the data storage nodes by restoring a point-in-time image of the data for which the restore command was received.

19. A computer program product comprising one or more computer-readable hardware storage devices having stored thereon computer-executable instructions that, when executed by one or more processors of a computer system, cause the computer system to implement a method for simultaneously restoring data from a single backup node to a plurality of data storage nodes, the method comprising the following:
receiving a restore command from a user, the restore command indicating that a specified portion of data of a parallel database is to be restored from an existing data backup at a backup node, wherein the data backup is stored in a data store at the backup node;
based on receiving the restore command, generating a plurality of restore commands, including generating a different restore command for each of a plurality of data storage nodes of the parallel database, each different restore command being configured to instruct the corresponding data storage node to initiate a restore of a corresponding piece of the specified portion of data that is stored at the existing data backup, such that the plurality of restore commands are configured to initiate a parallel restore from the existing data backup in the data store to each of the plurality of data storage nodes of the parallel database; and
initiating execution of the generated plurality of restore commands at each of the plurality of data storage nodes in a parallel manner, such that each corresponding piece of data from the existing data backup in the data store is restored in parallel to each corresponding data storage node.

20. The computer program product of claim 19, wherein the existing data backup includes corresponding pieces of data from a first number of data storage nodes, but the existing data backup is restored to a second number of nodes, the second number of nodes being greater in number than the first number of nodes.

21. A computer system comprising the following:
one or more processors;
system memory; and
one or more computer-readable storage media having stored thereon computer-executable instructions that, when executed by the one or more processors, cause the computing system to simultaneously back up data from a plurality of data storage nodes to a backup node, including at least the following:
  receiving a backup command indicating that a specified portion of data of a parallel database is to be backed up to a backup node, wherein the specified portion of data is stored across a plurality of different data storage nodes of the parallel database;
  based on receiving the backup command, generating a plurality of backup commands, including generating a different backup command for each of the plurality of data storage nodes, each different backup command being configured to instruct the corresponding data storage node to initiate a backup of a corresponding piece of the specified portion of data that is stored at the corresponding data storage node, such that the plurality of backup commands are configured to initiate a parallel backup from the plurality of data storage nodes to a single data store at the backup node; and
  initiating execution of the generated plurality of backup commands at each of the plurality of data storage nodes in a parallel manner, such that the corresponding piece of data from each of the plurality of different data storage nodes is backed up in parallel to the data store at the backup node, wherein a portion of corresponding metadata is stored with the backup data to indicate which data storage node each portion of data was received from.

22. The computer system of claim 21, wherein the backup is initiated by a single backup command to a single computer system.

23. The computer system of claim 21, wherein the backup includes a point-in-time image of the specified portion of data for which the backup command was received.

24. The computer system of claim 21, wherein each different backup command is configured to write the corresponding piece of the specified portion of data to a corresponding file in a directory at the data store.

25. The computer system of claim 21, wherein at least one of the plurality of backup commands is syntactically different than another of the plurality of backup commands.

* * * * *